Stephen Zalocha
INVENTOR.

BY Clarence A. O'Brien
and Harvey B. Jacobson
Attorneys

Stephen Zalocha
INVENTOR.

BY Clarence A. O'Brien
and Harvey B. Jacobson
Attorneys

United States Patent Office 2,841,742
Patented July 1, 1958

2,841,742

COLOR SCREEN FOR A CATHODE RAY TUBE

Stephen Zalocha, Sanborn, N. Y.

Application February 15, 1954, Serial No. 410,373
2 Claims. (Cl. 315—21)

This invention relates to a color screen for a cathode ray tube and particularly to a screen for producing colored images on the screen of a television tube, used in TV receiving apparatus.

In the production of images on the screens of cathode ray tubes, it is customary to provide a coating of a suitable phosphor on the tube and to activate the phosphor by means of a cathode ray gun. In order to produce colored images, it is necessary to utilize phosphors having different color characteristics. For example, it is possible to utilize phosphors having various colors, such as red, blue and green, and to blend these phosphors together to produce various colored pictures. It has heretofore been customary to divide the screen into a plurality of relatively minute squares and to activate the screen in squares to produce a pattern of the so-called television tube. Usually the squares are activated by line scanning, in which a cathode ray is directed successively on the squares following a particular line after which the squares in the next adjacent line will likewise be scanned, the light varying in intensity during the scanning operation. Because of the persistence of the phosphorescence after the bombardment, the consequent result is an apparently continuous glowing image of various intensity. To produce a color image, it is necessary to activate various color phosphors in proportion to the amounts of those colors in the original image so that the reproduction will be substantially the same blend of colors as the original square presented.

The present invention provides a screen for reproducing the colors of an original by providing each of the squares of the screen with a plurality of phosphors, as for example, a portion of red, a portion of blue and a portion of green. Also, it is necessary to provide separate excitations for each of these phosphors and to provide means for concentrating the excitation on the particular phosphor so that the excitation, for example, of the green phosphor will not also excite the blue phosphor and produce a wrong color. In the present example, the cathode ray is directed to a particular phosphor by means of an electrically polarized conductor associated therewith. In the present construction, each row or strata of the screen is provided with a plurality of microconductors and the phosphor for each of the strata is divided into relatively narrow strips which are associated with the underlying microconductors. Any suitable means may be utilized to polarize the microconductors with the particular color desired to be excited.

It is accordingly an object of the present invention to provide an improved cathode ray screen.

It is a further object of the invention to provide a cathode ray screen which will reproduce colors.

It is a further object of the invention to provide a cathode ray screen having color phosphors thereon and means for controlling the excitation of the phosphors.

It is a further object of the invention to provide a screen having microconductors embedded therein and strips of color phosphors associated with the embedded conductors.

Other objects and many of the attendant advantages of the present invention will be apparent from the following detailed description taken in conjunction with the accompanying drawing in which.

Figure 1:
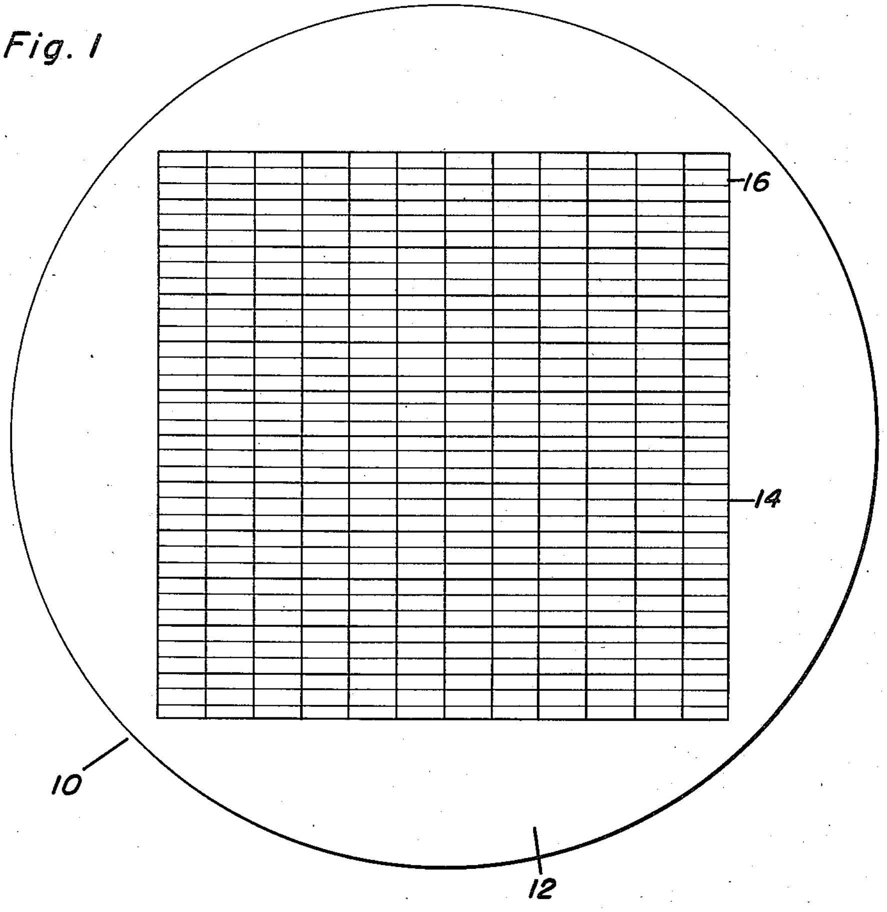
Figure 1 is a plan view of the end of a cathode ray tube having a suitable phosphor screen placed thereon.

In the examplary embodiment according to the invention, the cathode ray tube 10 is constructed of suitable transparent or translucent material and is provided with an end portion 12 which is of substantially plane formation, at least over a portion thereof, and a portion of the end 12 has phosphors applied thereto, preferably in a plurality of parallel strips with the entire surface being arranged into a grid of any suitable shape or dimensions.

The screen 14 is for purposes of convenience broken up into a plurality of squares 16 which represent an area which will be substantially simultaneously energized by the impingement of a cathode ray thereon, such as that produced by the cathode ray gun of the television construction. In the normal operation of the screen, each portion of the screen would be activated by scanning a line consisting of blocks 16 and then immediately thereafter, the next adjacent line of blocks 16 with each of the blocks or squares 16 having a different quantity of illumination, depending upon the intensity of the beam which, in turn, is determined by the intensity of the original source. In the construction according to the present invention, each block 16 will be provided with three distinct strips of phosphors 18, 20 and 22, with the strips 18, 20 and 22 producing a different color of light when excited. For example, the strip 18 may produce a red color when excited and the strip 20 may produce a blue color when excited, while the strip 22 will produce a green color when excited. Obviously, by exciting the colors 18, 20 and 22, in proportion to the amounts of those colors in an original object, the square 16 may reproduce substantially identical colors with the original object being reproduced. In order to reproduce the vision, according to the present invention, the row of blocks 16 will be scanned three times. The first time, the electron beam will be focused on the strip 18, the second time on the strip 20 and the third time on the strip 22 of each of the blocks 16 forming a continuous band across the face of the screen.

In order to prevent the cross excitation of the phosphors 18, 20 and 22, focusing conductors 24, 26 and 28 are placed under the phosphor strips 18, 20 and 22, respectively.

Microconductors 24, 26 and 28 are then connected to a suitable polarized collector device 30 which may be of any known type so that on the reception of a particular signal, the device 30 will polarize one of the conductors 24, 26 and 28 so that it will be positive while the remaining conductors will be polarized negative. For example, if the intensity of beam according to the red is being broadcast, the device 30 will cause the conductors 24 to be polarized positive while the conductors 26 and 28 will be polarized negative. Consequently, the electron beam falling on the square 16 will be attracted to the phosphor over the conductor 24, while it will be repelled from the phosphors over the conductors 26 and 28. Likewise, while the intensity of the color blue is controlling the intensity of the electron beam, the microconductor 26 will be polarized positive while the conductors 24 and 28 will be polarized negative so that all of the electrons being bombarded on the section will be attracted to the strip 20. Obviously, as many color schemes may be involved as the nature and size of the area will permit. However, it is usually customary to provide only the three standard colors, red, blue and green, and to excite these colors to the desired intensity so that because of the persistence of the glow of the phosphors, the particular squares will glow with substantially the color and brightness of the original object.

Figure 3:
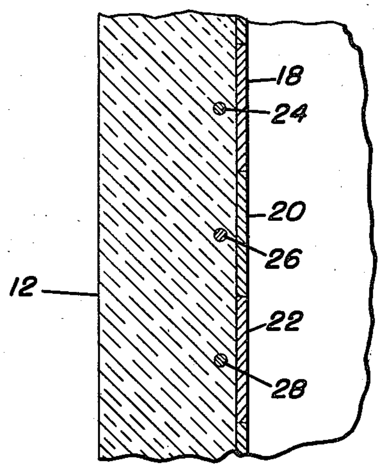
Figure 3 is a greatly magnified cross-section of a portion of the screen showing the construction utilizing microconductors completely insulated from the material of the screen.

Preferably, the microconductors 24, 26 and 28 are embedded in the material of the screen 12 and, as shown in Figure 3, they are embedded sufficiently deeply so that a layer of the screen material completely covers the microconductors so that they are completely insulated from the phosphor strips 18, 20 and 22.

Figures 2, 4, 5:
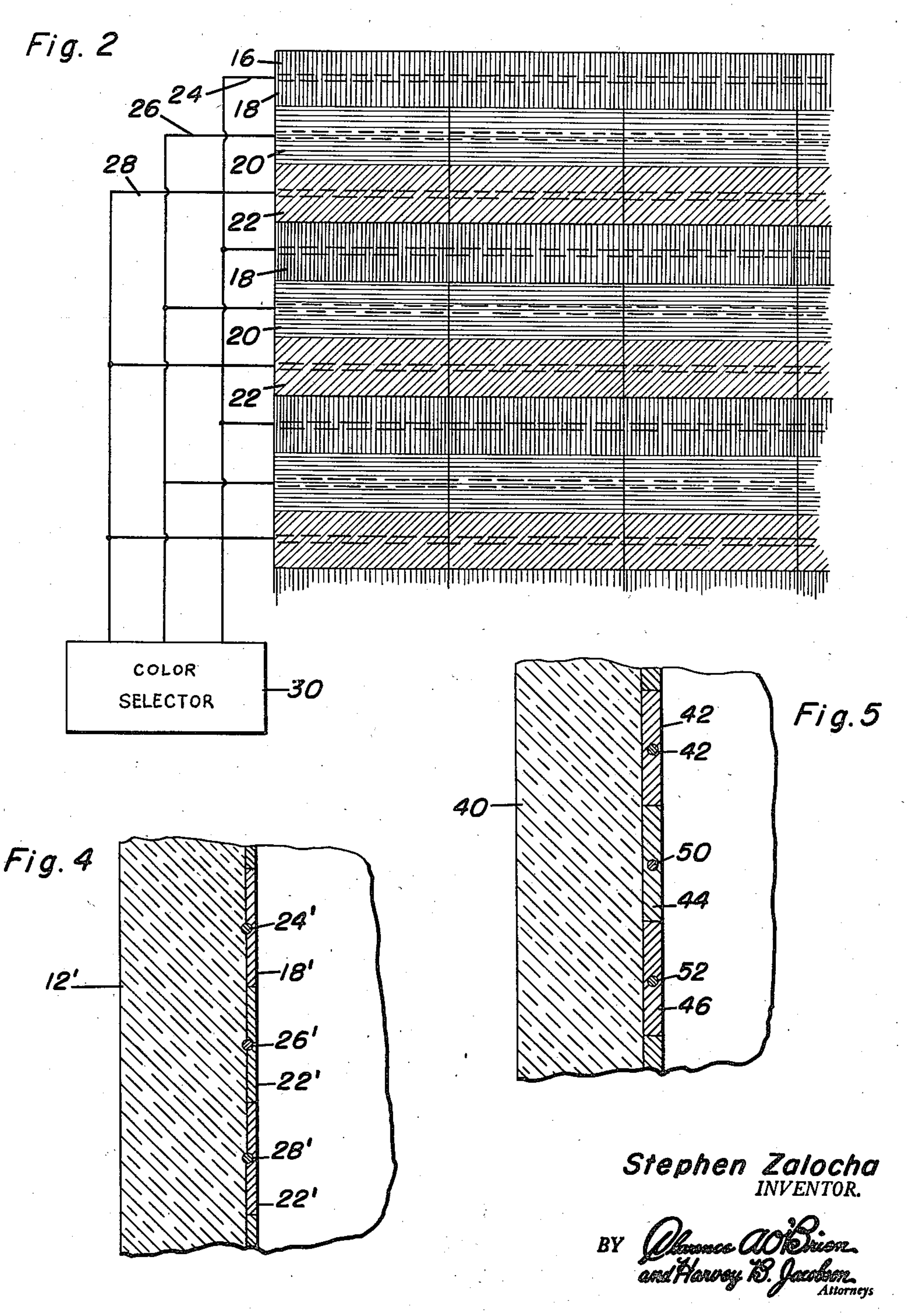
Figure 2 is a greatly magnified fragment of the screen showing the arrangement of phosphors and polarized conductors therein.
Figure 4 is a similar view showing the embedded conductors having a portion thereof in electrical contact with the phosphors.
Figure 5 is a similar view showing the microconductors completely embedded in the phosphor and separated from the material of the cathode screen.

A modification according to Figure 4 shows the surface 12′ has the microconductors 24′, 26′ and 28′ embedded only partially into the material thereof so that a portion of the conductors 24′, 26′ and 28′ will be in electrical contact with the phosphors 18′, 20′ and 22′.

In the modification according to Figure 5, the tube 10 is provided with a screen face 40 which is completely plane and the phosphor strips 42, 44 and 46 are applied thereto, and microconductors 48, 50 and 52 are embedded in the phosphor strips and completely independent of the face 40 of the tube.

In the operation of either of the modifications, all of the conductors 24 associated with the particular phosphor 18 of any of the blocks will be connected together, and likewise all of the conductors 26 associated with the phosphors 20 will be connected together so that a selector 30 will be a simple selector device responsive to the color being broadcast so that the proper phosphor will always be excited, regardless of the square being excited by the color being broadcast.

In the operation of the device, it will be apparent that suitable selector impulses will be broadcast along with each of the various broadcasts associated with a particular color, so that if a red color intensity is being broadcast, the selector device will be responsive to the broadcast signal to energize the microconductor associated with the phosphors reproducing the red color, and likewise with the other colors.

Obviously, the microconductors 24 to 28 will be of such small size that they will be substantially invisible in the screen and particularly will be invisible when the viewer is sufficiently far from the screen so that the various squares blend into a common picture.

While for purposes of exemplification, a particular embodiment of the invention has been shown and described according to the best present understanding thereof, it will be apparent to those skilled in the art that various changes and modifications in the construction and arrangement of the parts thereof may be readily resorted to without departing from the true spirit and scope of the invention.

What is claimed as new is as follows:

1. A screen for a television tube of a television receiving apparatus with a surface adapted to be bombarded by cathode rays which are moved over the screen along lines during scanning, comprising a base of vitreous material, a plurality of closely spaced, parallel focusing conductors, in the shape of microconductors arranged in substantial parallelism to the lines along which scanning takes place, located in close proximity to the central portion of the color producing phosphor strip placed on said screen surface adjacent phosphor strips having different color characteristics varying from strip to strip in predetermined sequence, conductor means for connecting focusing conductors associated with phosphor strips of the same color electrically, means for impressing electrical potentials on said conductor means and focusing conductors, the microconductors forming the focusing conductors being insulated from the phosphor strips by being embedded in the vitreous material of the screen directly behind the surface covered by the phosphor strips, said focusing conductor being thus adapted to locate the cathode ray centrally on the color strip, thus minimizing the deviation of the cathode ray.

2. A screen for television tubes of television receiving apparatus, said screen having a surface adapted to be bombarded by cathode rays moved over the screen along lines during scanning, comprising a base of vitreous material, a plurality of strips each consisting of a color producing phosphor, placed on said base of virteous material, the adjacent phosphor strips having different color characteristics which vary from strip to strip in a predetermined sequence, the said phosphor strips being parallel to each other and parallel to the lines along which the screen is scanned, focusing conductors partly embedded in the vitreous material of the base of the screen and partly embedded in the phosphor strips in close proximity to the central portion thereof, means for connecting the focusing conductors associated with phosphor strips of the same color characteristics electrically with each other and means for impressing electrical potential on said microconductors, said focusing conductors when charged centering the cathode ray on the phosphor strips, thus minimizing the deviation of the cathode ray from its correct position.

References Cited in the file of this patent

UNITED STATES PATENTS

| | | |
|---|---|---|
| 2,307,188 | Bedford | Jan. 5, 1943 |
| 2,446,249 | Schroeder | Aug. 3, 1948 |
| 2,446,440 | Swedlund | Aug. 3, 1948 |
| 2,461,515 | Bronwell | Feb. 15, 1949 |
| 2,577,368 | Schultz | Dec. 4, 1951 |
| 2,767,346 | Hoyt | Oct. 16, 1956 |
| 2,784,341 | Huffman | Mar. 5, 1957 |